Patented Mar. 21, 1933　　　　　　　　　　　　　　　　　　　　　1,902,337

UNITED STATES PATENT OFFICE

CARL NEUBAUER, OF MANNHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF FILMS, LACQUERS, AND THE LIKE

No Drawing.　Application filed December 9, 1926, Serial No. 153,738, and in Germany December 14, 1925.

In the German Patent No. 404,024 there is described a process for the production of films, lacquers and the like according to which a condensation product obtained by the condensation of urea or urea derivatives with formaldehyde, is treated, preferably in an organic solvent, with one or more non-volatile or duffficultly volatile substances, especially organic substances, such as acetyl- or nitro-cellulose, which are capable of forming solid solutions with the condensation product.

I have now found that film forming solutions, such as lacquers and the like, and coatings therefrom which possess particularly valuable properties may be obtained by incorporating with the condensation products obtained from urea and formaldehyde one or more substances of the kind above mentioned in a well defined proportion, namely in amounts equal to or greater than those of the urea-formaldehyde condensation product. The products produced in this manner are especially distinguished by the fact that they furnish solutions which, when applied on substrata, dry to highly lustrous, smooth, supple and strongly adherent coatings and which are admirably adapted to serve as lacquers for all kinds of purposes. The properties of these lacquers are influenced also by the solvent or solvents they contain.

Particularly suitable substances to be so added are water-insoluble organic colloidal substances, such as cellulose esters, such as nitro- and acetyl-cellulose, or cellulose ethers, all of which may, at the same time, contain softening agents or plasticizers, and also natural or artificial resins other than the aforesaid condensation products (which may also be used in association with varnishes, oils, and the like). Soluble or insoluble organic or inorganic coloring matters may also be added to the lacquers, and it is generally advisable, when insoluble coloring matters are used to incorporate these in a state of very fine division with the lacquers, so that they will not separate out as a deposit even on prolonged standing and extensive dilution. Methanol, dichlorhydrin, formamide, ethers of ethylene glycol and other glycols, lactic acid esters and the like may be mentioned as solvents suitable for the preparation of the solutions here described.

The following examples will further illustrate how the said invention may be carried out in practice but the invention is not limited to these examples. The parts are by weight.

Example 1

Ten parts of a 50 per cent solution of a condensation product obtained from urea and formaldehyde for example in methanol are dissolved in 40 parts of a 20 per cent solution of collodion, whereupon 20 parts of hexyl acetate and 20 parts of benzene are added. According to this process a clear viscous solution is obtained which, when sprayed on substrata such as leather, glass, paper, wood, textiles and the like, furnishes smooth and very glossy coatings.

Example 2

Ten parts of a 50 per cent solution of a condensation product obtained from urea and formaldehyde for example in methanol are dissolved in 40 parts of a 20 per cent solution of collodion, 20 parts of ethylene glycol mono-ethyl ether, 24 parts of cyclohexanol, 8 parts of butyl alcohol and 8 parts of propyl alcohol are then added. The lacquer obtained according to this process also furnishes smooth, supple and firmly adherent coatings with a high lustre.

I claim:

1. A composition of matter comprising a condensation product of urea and formaldehyde and at least one water-insoluble organic colloidal substance selected from the group consisting of cellulose esters and ethers in a quantity at least equal to that of the said condensation product.

2. Lacquers comprising a condensation product of urea and formaldehyde and at least one water-insoluble organic colloidal substance selected from the group consisting of cellulose esters and ethers in a quantity at least equal to that of the said condensation product, and a solvent therefor.

3. A composition of matter comprising a condensation product of urea and formaldehyde, and cellulose nitrate in a quantity at least equal to that of the said condensation product dissolved in a mixture of organic solvents.

4. Lacquers comprising a condensation product of urea and formaldehyde, soluble in methanol, and cellulose nitrate in a quantity at least equal to that of the said condensation product, dissolved in a mixture of organic solvents.

5. Lacquers comprising a condensation product of urea and formaldehyde, soluble in methanol, and cellulose nitrate in a quantity at least equal to that of the said condensation product, dissolved in a mixture of organic solvents comprising ethylene glycol monoethyl ether, cyclohexanol, butyl alcohol and propyl alcohol.

In testimony whereof I have hereunto set my hand.

CARL NEUBAUER.